(Model.)
J. C. HECK.
CULTIVATOR SHOVEL.
No. 250,530.            Patented Dec. 6, 1881.
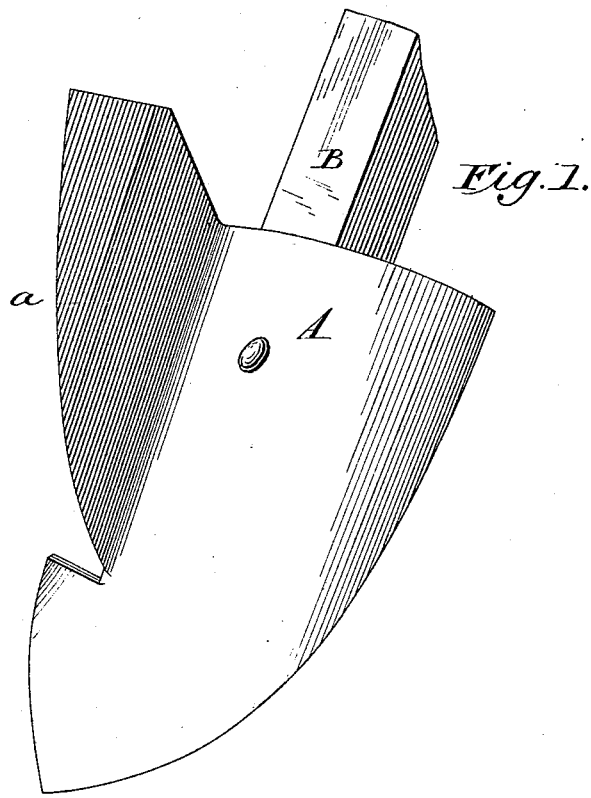
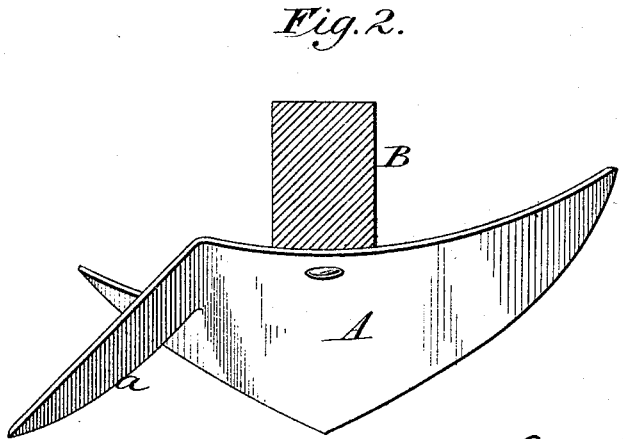
Attest:
Sidney P. Hollingsworth
Frank A. Law
Inventor:
John C. Heck,
by Dodge & Son,
Attys

UNITED STATES PATENT OFFICE.

JOHN C. HECK, OF MONROE, MICHIGAN.

CULTIVATOR-SHOVEL.

SPECIFICATION forming part of Letters Patent No. 250,530, dated December 6, 1881.

Application filed August 15, 1881. (Model.)

*To all whom it may concern:*

Be it known that I, JOHN C. HECK, of Monroe, in the county of Monroe and State of Michigan, have invented certain Improvements in Cultivator-Shovels, of which the following is a specification.

My invention relates to cultivators; and it consists in forming the blades or shovels with a wing or leaf at one side, extending forward and outward therefrom to intercept the clods, stones, &c., turned or raised by the shovel and prevent their falling upon the plants.

In the accompanying drawings, Figure 1 represents a perspective view of my improved shovel or blade, and Fig. 2 a view looking down upon the upper edge of the same.

The object of my invention is to protect plants from injury by reason of large clods of soil or stones being turned or thrown upon them by the shovel when working close to the plants, and to accomplish this result without the use of separate or special fenders, such as are now commonly employed.

To this end I construct the shovels or blades as represented in the accompanying drawings, in which A represents the shovel, and B the standard to which it is attached. The point or lower end of the shovel is of usual form, being convex on its front face, and slightly curled forward at its lower extremity to enter the soil readily and properly. At one side of the shovel or blade there is formed a wing, $a$, which, at or about the point to which the shovel enters the ground when in use, extends upward and outward, as shown in Fig. 1, preferably to a point above the top of the shovel. The wing or fender $a$ is bent or formed at an angle to the body of the shovel, and projects both sidewise and forward from the same, in which position it serves effectually to intercept any clods or stones which may be raised or turned by the point and thrown to that side, and to direct or throw them back toward the opposite side, the wing or leaf $a$ being at that side of the shovel which is to work next to the plants.

It will thus be seen that the plants are completely guarded and protected against the clods and stones, while the shovels are permitted to work close to the plants and to loosen up the soil about their roots to great advantage.

I am aware that separate fenders have heretofore been made in a variety of forms and applied to cultivators, being in some cases attached to the beam or standards and in others applied directly to the shovel; and I am also aware that a shovel has been formed with a backwardly-extending wing, somewhat resembling the mold-board of a plow, over which the soil rises and drops behind the shovel, and that plow shares and points have been formed with upright cutters integral therewith. I however believe myself to be the first to form upon a shovel or blade, and in one piece therewith, a fender adapted to throw the soil and stones away from the plants, as explained. By thus forming the wing or fender upon the shovel, which will, of course, be done in the act of forming the shovel, I not only cheapen the construction of the cultivator, but I also avoid all possibility of the fender becoming loose or getting out of place, and I secure a perfectly smooth face for the fender and shovel free from bolt or rivet heads or other projections which might interfere with the ready movement of the soil over their faces.

Having thus described my invention, what I claim is—

1. As an improved article of manufacture, a cultivator-shovel provided at one side with a forwardly-extending wing or fender integral with the shovel or blade, substantially as shown and described.

2. The herein-described shovel for cultivators, consisting of the body A, and the wing or fender $a$, extending forward and sidewise therefrom and formed in one piece therewith, substantially as shown and described.

JOHN C. HECK.

Witnesses:
GEO. SPALDING,
J. D. RONAN.